No. 12,393. REISSUED OCT. 10, 1905.

T. A. EDISON.

LEADING-IN WIRE FOR INCANDESCENT ELECTRIC LAMPS.

APPLICATION FILED JULY 12, 1905.

Witnesses:

John S. Schecht.

A. G. McDonnell.

Inventor

Thomas A. Edison

By Dyer & Dyer

Attorneys.

UNITED STATES PATENT OFFICE.

THOMAS A. EDISON, OF LLEWELLYN PARK, NEW JERSEY, ASSIGNOR TO EDISON ELECTRIC LIGHT COMPANY, A CORPORATION OF NEW YORK.

LEADING-IN WIRE FOR INCANDESCENT ELECTRIC LAMPS.

No. 12,393. Specification of Reissued Letters Patent. Reissued Oct. 10, 1905.

Original No. 444,530, dated January 13, 1891. Application for reissue filed July 12, 1905. Serial No. 269,418.

*To all whom it may concern:*

Be it known that I, THOMAS A. EDISON, a citizen of the United States, residing at Llewellyn Park, county of Essex, and State of New Jersey, have invented a certain new and useful Improvement in Leading-in Wires for Incandescent Electric Lamps, (Case No. 875,) of which the following is a specification.

In incandescent electric lamps the incandescent filament is connected to conductors, called the "leading-in" conductors, by means of which the filament within the sealed glass globe is connected with the circuit-wires outside of said globe. To maintain a stable vacuum, it has been found best to make these leading-in wires of platinum, since its coefficient of expansion is so nearly that of glass that less trouble is caused by its expansion and contraction than is experienced with other metals.

The object of this invention is to economize in the amount of platinum employed and at the same time to provide a seal around the leading-in wires which shall be as nearly perfect or more nearly perfect than with the constructions hitherto employed, while at the same time an effective support for the filament is formed and the loss arising from the breakage of the wires due to handling in the manufacture of the lamps is saved; and to this end my invention consists in the novel devices and combinations of devices hereinafter described and claimed.

Figure 1:
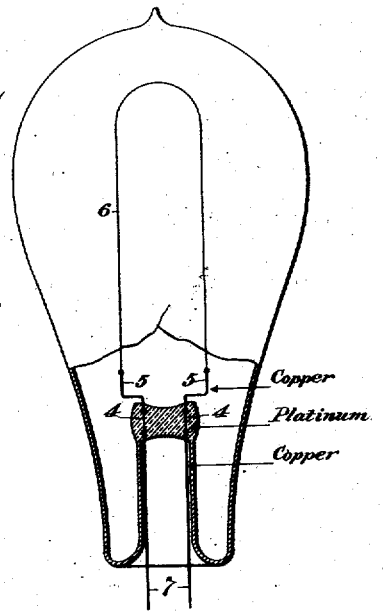
Figure 2:
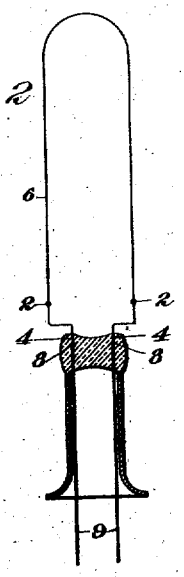

In the accompanying drawings, which illustrate my improvement, Figure 1 is a central section of an incandescent lamp embodying my invention; Fig. 2, a section of a part of a lamp, showing a modified arrangement of the leading-in wires; and Fig. 3, a similar view showing the arrangement usually heretofore employed for the purpose of comparison.

Figure 3:
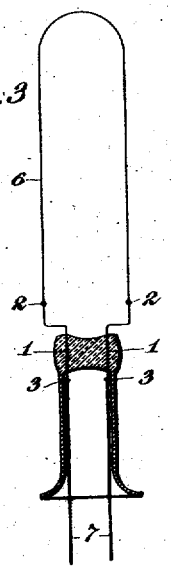

It is usual in the manufacture of incandescent electric lamps to introduce the platinum leading-in wires (marked 1 in Fig. 3) into a glass tube and then to fuse and compress the tube around the wires, thereby tightly sealing them into the glass. These wires have necessarily been of a considerable size, not for electrical reasons—that is, in order to be of sufficient conducting capacity to convey the current without undue heating—but for mechanical reasons, since they are required to support the filament and to be of such rigidity that they will not be bent by the weight of the filament or by the jarring to which they are subject in use, transportation, &c. These wires are also of a considerable length, extending, as shown in Fig. 3, from the end of the filament at 2 to point 3, where they are connected with copper wires. The use of platinum wires of such size and length obviously involves a very considerable expense.

I have found that wires of copper, iron, nickel, silver, and other metals and some alloys having a greater coefficient of expansion than platinum can be sealed into the glass; but on cooling they contract sufficiently to permit air to pass into the vacuum, although they will still be held mechanically rigid by the glass. I therefore in my present invention use leading-in wires of two metals, one section being of a metal having substantially the same coefficient of expansion as glass, such as platinum, the other being of a different and cheaper metal, and I seal both of the metals into the glass. The seal will remain perfect at the platinum sections, and it will therefore be immaterial if the copper or other wire contracts away from the glass, as described.

Two ways of sealing in the wires are illustrated in the drawings.

In Fig. 1, 4 and 4 are short sections of platinum wire several times smaller in cross-section than the leading-in wires heretofore used. To these platinum wires are connected larger copper or other wires 5, which support and conduct the current to the filament 6. To the other end of the platinum wires are connected conductors 7, which lead to the supply-circuit. The entire length of the platinum wires 4, as well as a portion of the conductors 5 and 7, are sealed into the glass, as shown, these wires being laid in the glass tube and the end of the tube softened by heat and pressed down upon said wires to form a flat seal, as will be well understood. I prefer to employ a platinum wire which is alloyed with iridium or other metals of the platinum group. The preferable alloy for the purpose is one containing about five per cent. of iridium. Since the size of such wire may, as stated, be made to depend solely on the electrical conditions, such wire may be made as small as will suffice to carry the current for the lamp without undue heating. While platinum has practically the same coefficient of expansion as certain kinds of glass, the glass used for incandescent electric lamps does not approach this quite so closely, and hence the platinum seal as heretofore made with the wire of comparatively large diameter necessary for mechanical stability has not been absolutely perfect, the contraction of the wire being greater than that of the glass; but by the use of the small wires, the proportion of the contraction being diminished and the total area available for leakage around the wires being also decreased, this difficulty is avoided. For a lamp taking one-half ampere of current platinum wires five-thousandths of an inch in diameter can be employed, which is evidently a very important saving. The saving in length is also of great importance. The bit of platinum wire used need only be long enough to make it practicable to attach the other sections of wire to it, this being done, preferably, by fusion. A wire one-eighth of an inch in length I find to make a perfect seal. I find that copper is the preferable metal to use in practice for the terminal wires. Silver would be preferred, because it does not oxidize; but on account of its low melting-point it is difficult to handle in making the lamp. I therefore prefer to use copper. This wire contracts in cooling, but not sufficiently to remove from it the mechanical support afforded by the glass. The copper wires may be of such size as to give the same mechanical support for the filament as has heretofore been afforded by those of platinum. It will be seen, therefore, that by my invention as so far described I obtain equal mechanical advantages and a better seal for an enormously-decreased cost in material.

The arrangement in Fig. 2 is slightly different from that above described. The platinum wires 4 are of the same size as those heretofore used, since in this case they support the filament, but are of less length, since they extend only from the end of the filament at 2 to the point 8 within the body of the glass, while the copper or other conductors 9 extend from that point to the outside of the lamp. Although this arrangement effects a great saving, it is not as great as in the form first described.

By comparing Figs. 1 and 2 with Fig. 3 it will be seen that in the first form the platinum used is a very small fraction of that used in the old lamp, being both shorter and finer, while in the lamp illustrated in Fig. 2 the amount of platinum is reduced about one-half, since the wire is reduced in length about one-half.

It will also be seen that in the construction shown by either Fig. 1 or Fig. 2 the including of a portion of the outgoing copper wires leading to the supply-circuit within the flat glass seal, thereby forming a mechanical support to these wires and to the joints between them and the inwardly-extending platinum wires, obviates the breakage of the wires at or above these joints due to handling in the manufacture of the lamps.

Having thus described my invention, what I claim is—

1. An incandescent electric lamp having leading-in wires composed of sections of different metals, each of such leading-in wires having a section of a metal whose coefficient of expansion is substantially the same as that of glass, and a section of a metal which has a different coefficient of expansion, the two sections being joined together and the latter section extending out of the lamp, adjacent portions of both sections being sealed into the glass, substantially as set forth.

2. An incandescent electric lamp having leading-in wires composed of sections of different metals, each of such leading-in wires having a section of a metal whose coefficient of expansion is substantially the same as that of glass, and a section of a metal which has a different coefficient of expansion, the two sections being joined together, the former section extending inwardly to the incandescent filament and the latter section extending out of the lamp, adjacent portions of both sections being sealed into the glass, substantially as set forth.

3. An incandescent electric lamp having leading-in wires, each composed of a section of fine platinum wire and a section of larger wire of a different metal, the two sections being joined together and the latter section extending out of the lamp, the glass of the lamp being sealed around the wire of both sections, substantially as described.

4. An incandescent electric lamp having leading-in wires of two metals, one section being a platinum wire and the rest being of a different metal, said platinum wire being sealed wholly within the glass, substantially as described.

5. An incandescent electric lamp having leading-in wires composed of three or more sections, one section being of platinum and wholly sealed into the glass, the other sections being of a different metal and extending from the platinum section into the sealed globe for connection with the filament and extending in the opposite direction for connection with the circuit-wires, substantially as described.

This specification signed and witnessed this 5th day of July, 1905.

THOS. A. EDISON.

Witnesses:
FRANK L. DYER,
ANNA R. KLEHM.